(12) United States Patent  (10) Patent No.: US 9,225,605 B2
Manam et al.  (45) Date of Patent: Dec. 29, 2015

(54) DYNAMIC RE-ASSIGNMENT OF SERVICE PORTS TO ACTIVE VIRTUAL NETWORK SWITCH BASED ON SERVICE POLICY

(71) Applicant: Cisco Technology, Inc., San Jose, CA (US)

(72) Inventors: Rajasekhar Manam, San Jose, CA (US); Venkata Naga Ramesh Ponnapalli, Sunnyvale, CA (US); Sridar Kandaswamy, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 179 days.

(21) Appl. No.: 13/680,503

(22) Filed: Nov. 19, 2012

(65) Prior Publication Data

US 2014/0140221 A1  May 22, 2014

(51) Int. Cl.
*H04L 12/24* (2006.01)
*H04L 12/931* (2013.01)

(52) U.S. Cl.
CPC ............ *H04L 41/12* (2013.01); *H04L 41/5054* (2013.01); *H04L 49/70* (2013.01); *H04L 41/0668* (2013.01); *H04L 41/0886* (2013.01); *H04L 41/0893* (2013.01)

(58) Field of Classification Search
CPC ..... H04L 41/12; H04L 49/70; H04L 41/5054; H04L 41/0893; H04L 41/0668; H04L 41/0886; H04L 41/0816; H04L 41/0654; H04L 45/28; H04L 45/02; H04L 45/586; H04L 69/40; H04L 47/125

USPC ......... 370/250, 242, 351, 401, 254, 225, 219, 370/244, 360, 216

See application file for complete search history.

(56) References Cited

U.S. PATENT DOCUMENTS

| | | | |
|---|---|---|---|
| 7,209,435 B1* | 4/2007 | Kuo et al. | 370/219 |
| 8,576,840 B2* | 11/2013 | Larsen et al. | 370/389 |
| 8,654,630 B2* | 2/2014 | Lei et al. | 370/219 |
| 2007/0183313 A1* | 8/2007 | Narayanan et al. | 370/216 |
| 2010/0054129 A1* | 3/2010 | Kuik et al. | 370/235 |
| 2012/0170477 A1* | 7/2012 | Hieda | 370/252 |
| 2012/0278802 A1* | 11/2012 | Nilakantan et al. | 718/1 |
| 2014/0122724 A1* | 5/2014 | Zhang et al. | 709/226 |

* cited by examiner

Primary Examiner — Kwang B Yao
Assistant Examiner — Ricardo Castaneyra
(74) Attorney, Agent, or Firm — Patterson & Sheridan, LLP

(57) ABSTRACT

Embodiments generally provide techniques for mapping service modules on a network device. Embodiments identify a plurality of service modules, each configured to perform a respective service. A first one of the plurality of service modules is mapped to a first one of a plurality of virtual switches on the network device. Service policy information for a plurality of virtual switches is retrieved. The service policy information is indicative of service requirements for each of the plurality of virtual switches. Upon detecting an occurrence of a predefined event, embodiments determine a second one of the plurality of virtual switches to map the first service module to, based on the service policy information. The first service module is then mapped to the second virtual switch.

21 Claims, 5 Drawing Sheets

DYNAMIC RE-ASSIGNMENT OF SERVICE PORTS TO ACTIVE VIRTUAL NETWORK SWITCH BASED ON SERVICE POLICY

TECHNICAL FIELD

Embodiments presented in this disclosure generally relate to switching network traffic, and more specifically, to techniques for mapping available service modules to virtualized network switches.

BACKGROUND

The traffic flowing into a network device—e.g., a router, switch, bridge, server, and the like—is generally made up of multiple abstraction layers (e.g., the Open Systems Interconnection (OSI) model). Each of these logical layers generally relates to communications functions of a similar nature. For instance, layer 2 of the OSI model is known as the data link layer and uses physical addressing (e.g., Media Access Control (MAC) addresses) for switching traffic. Layer 2 encapsulation generally provides the mechanism for transferring data between network entities, and can also be used for error correction for layer 1. As another example, layer 3 traffic is known as network layer traffic and uses logical addressing (e.g., Internet Protocol (IP) addresses) for routing traffic. Layer 3 encapsulation generally provides the mechanism for transmitting data between a source host on a first network to a destination host located on a second network.

Network devices, such as switches, can be configured with service modules, each of which performs a particular function. For example, one of the service modules could provide load balancing functionality on the network device, while another service module could provide firewall services on the network device. These service modules could execute on an apparatus external to the network device. For instance, a service module could execute on a computing system communicatively coupled to the network device. Additionally, the service modules could be integrated into the network device. For instance, a service module could be implemented as an application-specific integrated circuit (ASIC) on a card that is plugged into a slot on the network device.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DESCRIPTION OF EXAMPLE EMBODIMENTS

Overview

Figure 1:
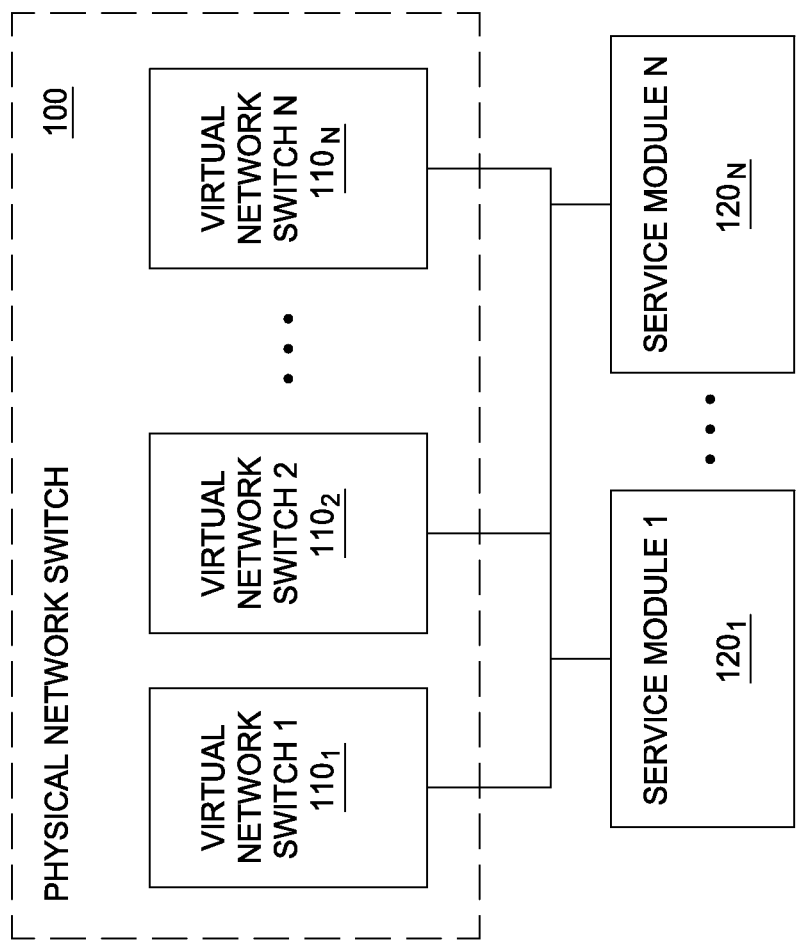
FIG. 1 illustrates a physical network switch configured with multiple virtual network switches, according to one embodiment described herein.

Embodiments provide a method, network device and computer program product for mapping service modules on a network device. The method, network device and computer program product include identifying a plurality of service modules, each configured to perform a respective service, where a first one of the plurality of service modules is mapped to a first one of a plurality of virtual switches on the network device. Additionally, the method, network device and computer program product include retrieving service policy information for the plurality of virtual switches. Here, the service policy information is indicative of service requirements for each of the plurality of virtual switches. Upon detecting an occurrence of a predefined event, the method, network device and computer program product include determining a second one of the plurality of virtual switches to map the first service module to, based on the service policy information. The method, network device and computer program product also include mapping the first service module to the second virtual switch.

Example Embodiments

A network device (e.g., a network switch) is a computer device that connects network segments. A network device may operate at one or more layers including, for example, the physical layer, the data link layer, the network layer, and/or the transport layer. While four layers are described, it is to be appreciated that in different examples a switch may operate at all seven layers of the Open Systems Interconnection (OSI) stack. For instance, a network device may inspect data packets as they are received. In doing so, the network device may determine the source and destination of a packet and may forward it accordingly. Additionally, a network device may contain some intelligence beyond examine and forward logic. This intelligence facilitates having a network device perform some management functions. For example, a network device could selectively turn some port range on or off, may selectively establish and/or maintain priority settings for ports, may perform media access control (MAC) filtering to prevent MAC flooding, may use a spanning tree protocol, may perform link aggregation, and so on. Typically, when these management functions are performed, they are performed in actual (e.g., physical) network devices.

Virtualization generally concerns separating a resource from underlying physical resources. Virtualization techniques can be applied to various devices and programs (e.g., computers, operating systems). These virtualization techniques can be applied to network switches as well. A virtual machine (VM) is a representation of a real machine using software that provides an operating environment that can run a host and its applications. A VM may be used to run applications and/or may be used as an appliance for a designated purpose and/or function. Even though a network switch may be virtualized, a virtual switch is typically connected in some manner to an actual, physical switch. Generally, the virtual switch provides connectivity to the physical ports of the physical switch on which the virtual switch is running (or to which the virtual switch is connected). However, one skilled in the art will appreciate that in one example a virtual switch could connect virtual machines on a single physical server and thus, in such an example, would not be connected to an actual switch.

Virtualization allows one device (e.g., a computer, a network device, etc.) to do the job of multiple devices by sharing the resources of the single device across multiple virtual environments. Generally, a VM is a tightly isolated software container that can run its own operating system and applications as if it was a physical machine. A VM generally behaves like a physical machine and has its own virtual (e.g., software-based) processor, memory, network interface card(s), and so on. However, a virtual device may be pure software and thus may be completely independent from an underlying physical hardware. Therefore, a virtual device may be migrated between different underlying physical hardware. Generally, a VM may have a number of virtual ports (also referred to as virtual interfaces) that connect to a switch (either physical or virtual).

Additionally, virtual switches may provide various services such as, without limitation, firewall services, load balancing services and quality of service (QoS) functionality. Generally, these services may be provided on the virtual switch by service modules, which can be broadly subdivided into internalized service modules and external service modules. The service modules may be communicatively coupled to the virtual switch via one or more ports. As defined herein, the ports which connect the virtual switch and the service modules are referred to as "service ports." More generally, the "service ports" refer to any connection mechanism that can be used for communications between the service modules and the virtual switch. For instance, one example of a service port could be an external Ethernet port for use in communicating with an external service module, while another service port could be an internal connection (e.g., as part of the backplane, such as a PCIe connection) for use in connecting with an internal service module. Of course, such examples are provided without limitation and for illustrative purposes only, and one of ordinary skill in the art will quickly recognize that the "service ports" can refer to numerous other types of connections, both known and unknown, that can be used consistent with the present disclosure.

Generally, virtualization allows for the segmentation of physical resources amongst various virtual containers. For example, in the context of virtual network switches, multiple different tenants could share a single physical network switch, and multiple virtual network switches could be created on the physical network switch to isolate the network traffic of the various tenants. For instance, various ports on the physical network switch could be assigned to each of the virtual network switches, and the traffic on these various ports could be managed by separate switching logic, to ensure that each tenant's network traffic is isolated from that of the other tenants. Advantageously, doing so helps to ensure efficient utilization of networking hardware (e.g., the tenants can share a single physical switch, rather than each requiring separate physical switches) while ensuring that each tenant's traffic is securely isolated from that of the other tenants.

Internalized service modules could be implemented using hardware and firmware within the physical switch on which the virtual switch is running. As an example, one internalized service module could be implemented as logic running on an application-specific integrated circuit (ASIC) within the physical switch (e.g., service cards for network switches). The ASIC (or the card on which the ASIC resides) may be connected to the virtual switch via one or more service ports. Such internalized service modules may be preferable, for instance, for virtual switches with enhanced security requirements and which require a dedicated internal service module (e.g., to comply with particular government regulations).

On the other hand, an external service module may be provided by an external apparatus. For instance, such an external service module may be implemented using hardware, firmware, software, or some combination of the three, and may be communicatively coupled to the virtual switch via one or more service ports. Such an external service module may be preferable, for instance, as the capabilities of the external service module may be more easily expandable and for lower cost.

Generally speaking, a single physical network switch (e.g., a Cisco® Nexus 7000 switch) may support multiple virtual switches. Additionally, a respective one or more service modules may be mapped to each virtual switch running on the physical switch. A service module could be mapped to a virtual switch by, for instance, assigning the service port(s) associated with the service module to the virtual switch. As an example, a particular service module that provides load balancing services could correspond to a particular service port, and the particular service port could be mapped to one of the virtual switches to provide load balancing services for the virtual switch. Such a mapping may be performed, for instance, by a network administrator of the virtual switch.

The service modules may be mapped to various virtual switches, based on the needs of the virtual switches and the services offered by the service module. For instance, one virtual switch may require a minimum of 10 Gbps and may be capable of utilizing up to 40 Gbps of firewall services, while a second virtual switch could require a minimum of 10 Gbps and may be capable of utilizing up to 30 Gbps of firewall services. For purposes of this example, assume that a 10 Gbps firewall service module and a 30 Gbps firewall service module are available for use by the virtual switch. In this example, a network administrator could assign the 10 Gbps firewall service module to the first virtual switch, satisfying the first virtual switch's minimum requirements, and could assign the 30 Gbps firewall service module to the second virtual switch, satisfying the second virtual switch's minimum and maximum requirements.

However, if at some later point in time, the second virtual switch goes offline, any service modules assigned to the second virtual switch may sit idle. These resources (i.e., the service modules) may continue to sit idle until a network administrator manually reassigns the service modules to another virtual switch. However, such a manual reallocation of resources can be a slow, time-consuming process, particularly if the network administrator attempts to manually optimize the allocation of service module resources to virtual switches (i.e., to reallocate service modules to virtual switches in a way that best satisfies the requirements of the virtual switches). As a result, service module resources go often underutilized, resulting in an inefficient allocation and usage of resources.

An example configuration for a physical network switch is shown in FIG. 1, which illustrates a physical network switch configured with multiple virtual network switches, according to one embodiment described herein. As shown, the physical network switch 100 includes a plurality of virtual network switches $110_{1-N}$. As an example, the physical network switch 100 could be a Cisco® Nexus 7000 Series Switch, and each of the virtual network switches $110_{1-N}$ could be a separate virtual device context (VDC). Additionally, the physical network switch 100 is coupled to a plurality of service modules $120_{1-N}$. As discussed above, the service modules $120_{1-N}$ could be internalized service modules (e.g., logic for providing a service implemented on a card connected to the physical network switch 100) or external service modules (e.g., a standalone apparatus configured to provide a service and communicatively coupled to the physical network switch 100). As such, although the various service modules $120_{1-N}$ are shown as located outside of the physical network switch 100, such an illustration is for illustrative purposes only and is without limitation. As discussed above, each of the service modules $120_{1-N}$ is connected to the physical network switch 100 by a respective one or more ports (also referred to herein as "service ports").

Here, assume that the service module $120_1$ is mapped to the virtual network switch $110_1$, and that the service module $120_2$ is mapped to the virtual network switch $110_2$. Currently, in the event the virtual switch $110_1$ no longer needs the service provided by the service module $120_1$ (e.g., when the virtual $110_1$ goes offline), the service module $120_1$ would remain mapped to the virtual switch $110_1$, until manually reconfigured by a network administrator. As a result, the resources of service module $120_1$ may sit idle for some period of time, until the service module $120_1$ is manually remapped to a different one of the virtual switches $110_{1-N}$. As such, the resources of the physical network switch 100 (i.e., the service modules $120_{1-N}$) may be underutilized in current configurations.

Figure 2:
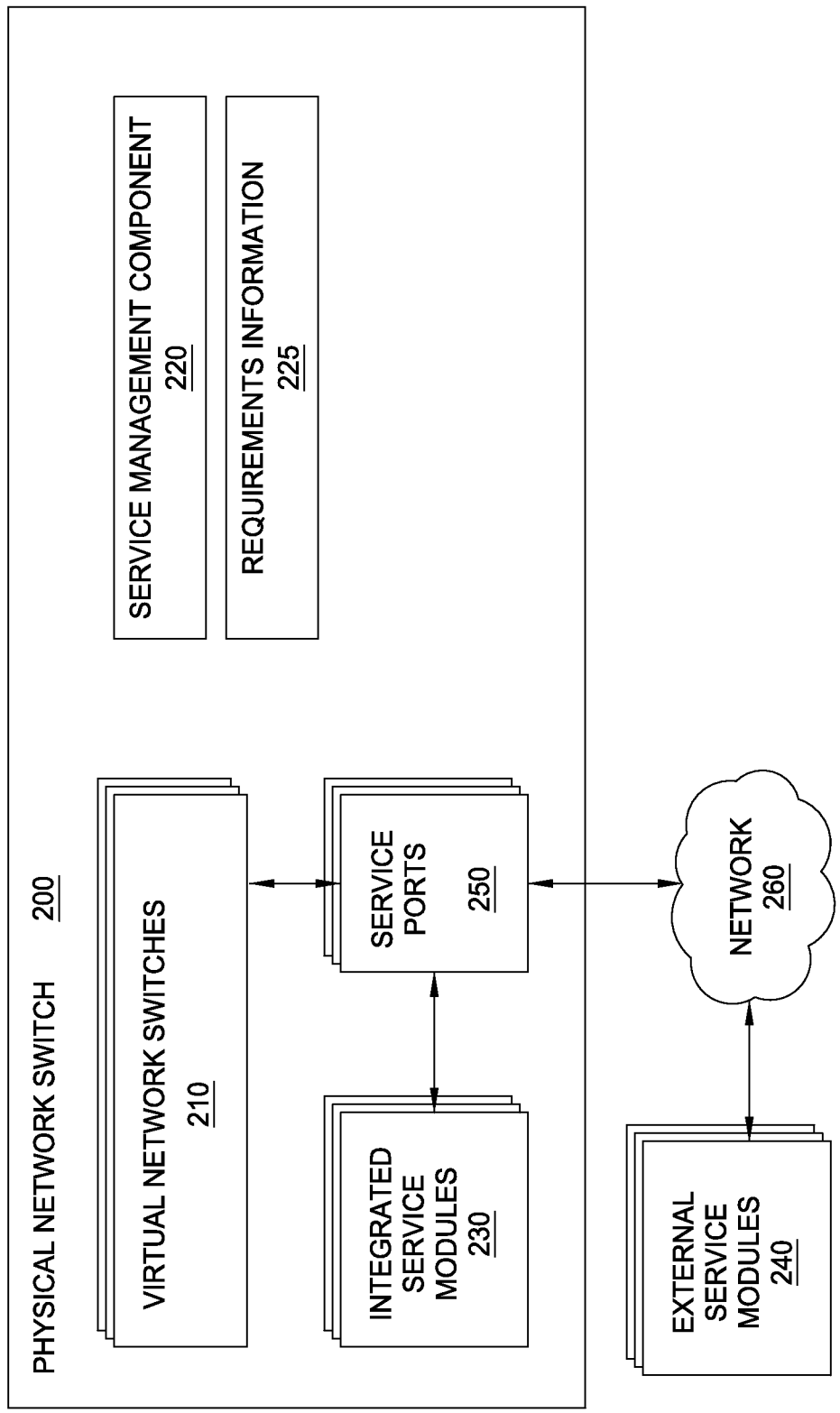
FIG. 2 illustrates a physical network switch configured with a service management component, according to one embodiment described herein.

Accordingly, embodiments provide techniques for mapping service modules to virtual switches. An example embodiment is shown in FIG. 2, which illustrates a physical network switch configured with a service management component, according to one embodiment described herein. As shown, the physical network switch 200 includes a plurality of virtual network switches, communicatively coupled to a plurality of service ports 250. The service ports 250 are coupled to integrated (or internalized) service modules 230 (e.g., logic for providing a service implemented on a pluggable card), and are coupled to external service modules (e.g., a standalone apparatus configured to perform a service) via the network 260. It is broadly contemplated that the service modules 230 and 240 may be connected to the ports 250 using a wide variety of communication techniques, including Ethernet communications, PCIe communications, and more generally, any communication technique (known or unknown) suitable for connecting a service module with a port of a network switch.

Additionally, the physical network switch 200 includes a service management component 220 and service requirements data 225. Generally, the service management component 220 is configured to manage the allocation and assignment of the service modules 230 and 240 to the virtual network switches 210. For instance, the service management component 220 could track and maintain a listing of service modules that are available on a particular physical switch. As discussed above, the plurality of service modules could include internal service modules, external service modules or both. Generally, each of the service modules is configured to perform a respective service. Examples of such services include load balancing services and firewall services. Here, assume that a first one of the plurality of service modules is mapped to a first one of a plurality of virtual switches on the network device.

The requirements data 225 (also referred to herein as "service policy data") generally represents data characterizing the service requirements for the virtual network switches 210. Such requirements data 225 may indicate, for instance, one or more types of services that are needed by a particular virtual switch 210. As an example, the requirements data 225 could indicate that one virtual switch 210 needs both load balancing services and firewall services. Additionally, the requirements data 225 could indicate additional requirements for a virtual switch with respect to a particular type of service. For instance, the requirements data 225 could indicate a minimum amount of throughput for a particular type of service needed by a virtual switch 210. As an example, the requirements data 225 could indicate that a particular virtual switch 210 needs a load balancing service capable of handling a minimum of 10 Gbps of data. Additionally, the requirements data 225 could specify a virtual switch's maximum usable amount of throughput for a particular type of service, which indicates a maximum amount of throughput for the particular type of service that the virtual switch can take advantage of. For instance, continuing the above example, the requirements data 225 could indicate that while the particular virtual switch 210 needs a load balancing service capable of handling a minimum of 10 Gbps of data, the particular virtual switch 210 can take full advantage of a load balancing service capable of handling a maximum of 40 Gbps of data.

Generally, the service management component 220 can use the requirements data 225 to manage the allocation of service modules 230 and 240 to the virtual network switches 210. For instance, the service management component 220 could detecting that a particular one of the virtual network switches 210 is no longer using a particular integrated service module 230. As an example, the service management component 220 could detect that the particular virtual network switch 210 has gone offline, and could determine that any service modules 230 and 240 mapped to the particular virtual network switch 210 are no longer being used.

The service management component 220 could then determine another one of the virtual network switches 210 to map the particular integrated service module 230 to, based on the requirements data 225. For instance, assume that the requirements data 225 indicates the service requirements shown below in Table 1.

TABLE 1

Virtual Switch Service Requirements Data

| Virtual Switch ID | Service Type | Minimum Required Throughput | Maximum Usable Throughput |
|---|---|---|---|
| VDC1 | LOAD BALANCING | 10 GBPS | 40 GBPS |
| VDC1 | FIREWALL | 20 GBPS | 40 GBPS |
| VDC2 | LOAD BALANCING | 10 GBPS | 40 GBPS |
| VDC2 | FIREWALL | 20 GBPS | 40 GBPS |

In this example, Table 1 depicts the requirements data 225 for two virtual network switches 210 (i.e., "VDC1" and "VDC2"), both of which require a minimum of 10 Gbps of load balancing service and 20 Gbps of firewall service. Additionally, both depicted virtual network switches 210 (i.e., "VDC1" and "VDC2") can take advantage of up to 40 Gbps of load balancing services and 40 Gbps of firewall services.

The service management component 220 may also maintain performance data characterizing the service modules 230 and 240. An example of such service module data is shown below in Table 2.

TABLE 2

Service Module Data

| Service Module ID | Service Port ID | Service Type | Internalized | Processing Throughput | Assigned Virtual Switch ID |
|---|---|---|---|---|---|
| SM1 | PORT1 | LOAD BALANCING | 1 | 10 GBPS | VDC1 |
| SM2 | PORT2 | LOAD BALANCING | 1 | 30 GBPS | VDC2 |
| SM3 | PORT3 | FIREWALL | 0 | 40 GBPS | VDC1 |
| SM4 | PORT4 | FIREWALL | 0 | 40 GBPS | VDC2 |

Thus, in this example, service module "SM1" is an internalized service module that provides 10 Gbps of load balancing services and is mapped to virtual network switch "VDC1". Likewise, the service module "SM2" is also an internalized service module that provides load balancing services, but is able to provide these services for up to 30 Gbps of data. Here, the service module "SM2" is mapped to the virtual network switch "VDC2."

In this example embodiment, the service management component 220 could monitor the virtual switches "VDC1" and "VDC2", and at some point, could detect that the virtual network switch "VDC2" has gone offline. The service management component 220 could then determine that the virtual network switch "VDC2" is thus no longer using the service module "SM2". Additionally, the service management component 220 could determine that the virtual network switch "VDC1" can utilize up to 40 Gbps of load balancing services (e.g., based on the service requirements data depicted in Table 1) that, but that only 10 Gbps of load balancing services are currently mapped to the virtual network switch "VDC1" (e.g., based on the service module data depicted in Table 2). Accordingly, the service management component 220 could automatically map the service module "SM2" to the virtual network switch "VDC1", thereby providing the maximum usable amount of load balancing services for the network switch "VDC1" (i.e., 10 Gbps+30 Gbps of load balancing services, for a combined total of 40 Gbps of load balancing services). Advantageously, doing so helps to ensure that all the resources of the physical network switch 200 are effectively utilized.

Additionally, service modules 230 and 240 may become available for reasons other than a virtual network switch 210 to which the service modules are mapped no longer needing the service modules. As an example, an integrated service module 230 implemented as logic on a pluggable card could become available when the card is plugged into a slot of the physical network switch 200. In such an example, the service management component 220 could detect that the integrated service module 230 is available and could determine a virtual network switch 210 that is best-suited for mapping the service module to (e.g., based on the service requirements data 225). Advantageously, doing so provides an intuitive and efficient way of allocating service modules 230 and 240 to virtual network switches 210.

In some embodiments, the requirements data 225 may specify a requirement of either an internalized or an external service module of a particular type for a particular virtual network switch 210. As an example, the requirements data 225 could specify that one virtual switch 210 is allowed to use only internalized service modules in order to comply with governmental security regulations. In such an example, the service management component 220 could use such requirements data 225 to ensure that an appropriate service module 230 or 240 is assigned to the particular virtual network switch 210.

Figure 3:
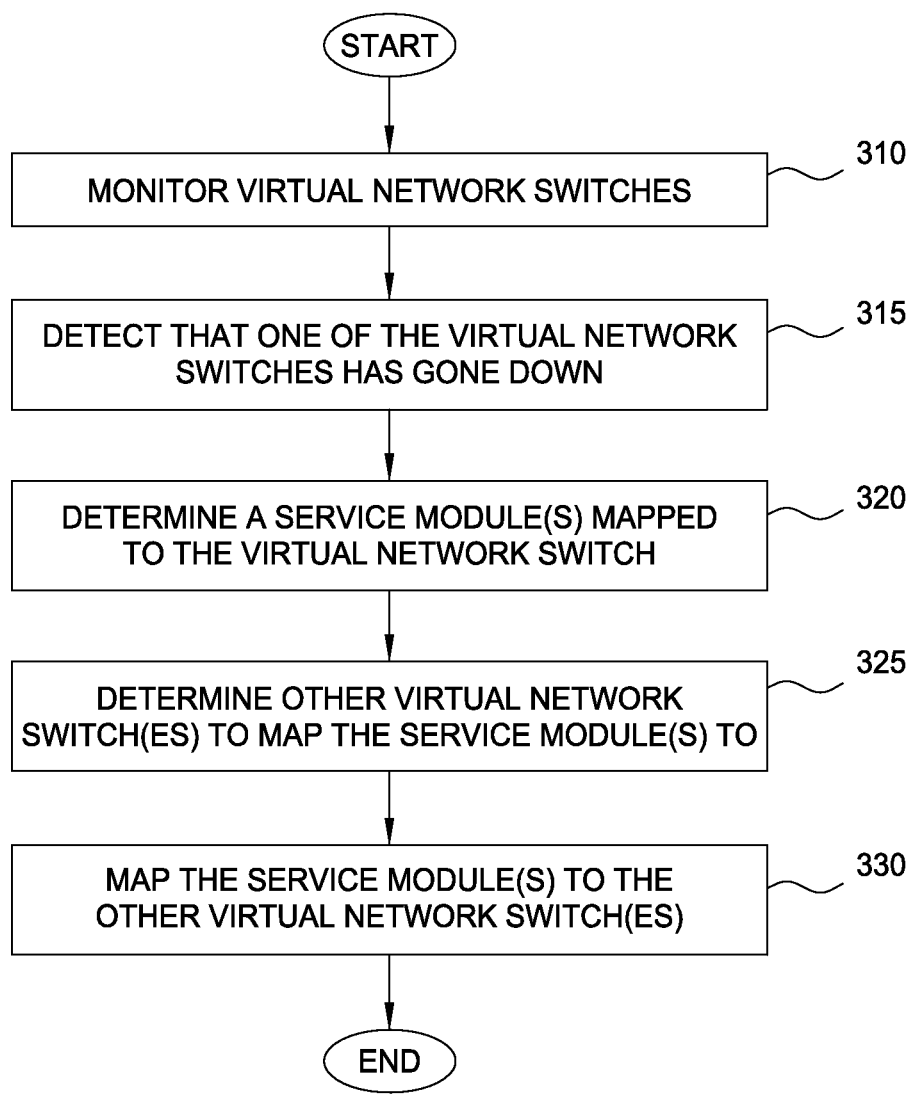
FIG. 3 illustrates a method for reassigning service modules to virtual network switches, according to one embodiment described herein.

FIG. 3 illustrates a method for reassigning service modules to virtual network switches, according to one embodiment described herein. As shown, the method 300 begins at block 310, where a service management component 220 monitors a plurality of virtual network switches on a physical network device. At some point, the service management component 220 detects that one of the virtual network switches has gone offline or has otherwise become unavailable (block 315). The service management component 220 then determines one or more service modules that were mapped to the now unavailable network switch (block 320). For instance, the service management component 220 could reference service module data (e.g., as shown in Table 2) to determine one or more service modules that were mapped to the now-offline virtual switch.

Additionally, the service management component 220 determines one or more other virtual network switches to map the available service modules to (block 325). For instance, the service management component 220 could reference requirements data (e.g., as shown in Table 1) to determine one or more other virtual network switches capable of utilizing the available service modules. The service management component 220 then maps the service modules to the determined virtual network switches (block 330), and the method 300 ends.

As an example, the service management component 220 could be configured to first determine whether the available service modules are needed to satisfy the minimum requirements of any of the virtual switches and, if so, to map the available service modules so that the minimum requirements of the virtual switches are satisfied. If all the minimum requirements of the virtual switches are satisfied, the service management component 220 could then determine whether any virtual switches are capable of utilizing the available service modules. As discussed above, the service management component 220 could make such determinations based on the requirements data for the virtual switches. For instance, if a service module that provides 20 Gbps of firewall services becomes available, and the service management component 220 determines that a particular virtual switch is capable of utilizing 40 Gbps of firewall services but currently is assigned only 10 Gbps of firewall services, the service management component 220 could map the available service module to the particular virtual switch, thereby providing 30 Gbps of firewall services for the virtual switch. Advantageously, doing so helps to ensure efficient and full utilization of service modules across the virtual network switches.

Figure 4:
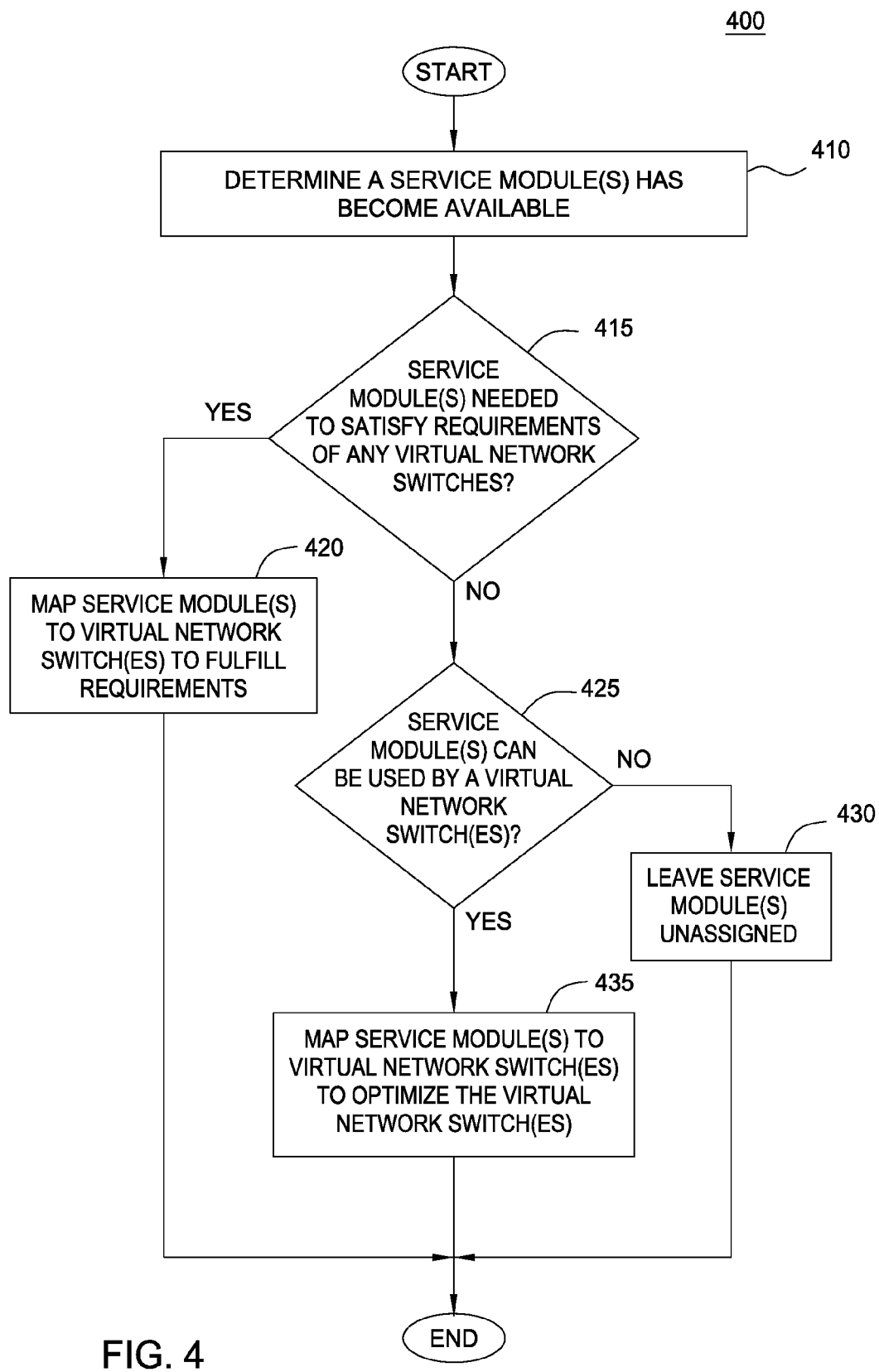
FIG. 4 illustrates a method for reassigning service modules to virtual network switches, according to one embodiment described herein.

FIG. 4 illustrates a method for reassigning service modules to virtual network switches, according to one embodiment described herein. As shown, the method 400 begins at block 410, where a service management component 220 determines that a service module has become available. Such a service module may become available, for instance, when it is first connected to a physical network switch (e.g., when a card is first plugged into the physical network switch, when an external apparatus is first connected to a port of the physical network switch, etc.). As another example, a service module may become available when the virtual network switch it is mapped to goes offline.

Upon determining a service module has become available, the service management component 220 determines whether the available service module is needed to satisfy the minimum requirements for any of the virtual switches on the physical network device (block 415). If so, the service management component 220 maps the available service module to the virtual switches so as to satisfy the minimum requirements, and the method 400 ends. For instance, a new virtual switch could be created on a physical switch, the new virtual switch requiring a minimum of 10 Gbps of load balancing services. A network administrator could then connect a service module that provides 10 Gbps of load balancing services to a port of the physical switch, and the service management component 220 could automatically detect that the service module is needed to satisfy the minimum requirements of the new virtual switch and could automatically assign the service module to the new virtual switch.

If instead the service management component 220 determines that the available service module is not needed to satisfy the minimum requirements of the virtual network switches, the service management component 220 then determines whether the available service module can be utilized by one of the virtual network switches (block 425). If not, the service management component 220 leaves the available service module unassigned, and the method 400 ends.

On the other hand, if the service management component 220 determines that one of the virtual network switches can utilize the available service module, the service management component 220 maps the available service module to the virtual network switch (block 435) and the method 400 ends. For instance, the service management component 220 could determine that a particular virtual network switch is capable of utilizing 40 Gbps of load balancing services, but is currently only assigned service modules that provide 10 Gbps of load balancing services. Upon determining that a service module providing 30 Gbps of load balancing services has become available, the service management component 220 could map the available service module to the particular virtual network switch, thereby providing a full 40 Gbps of load balancing services for the virtual network switch.

Figure 5:
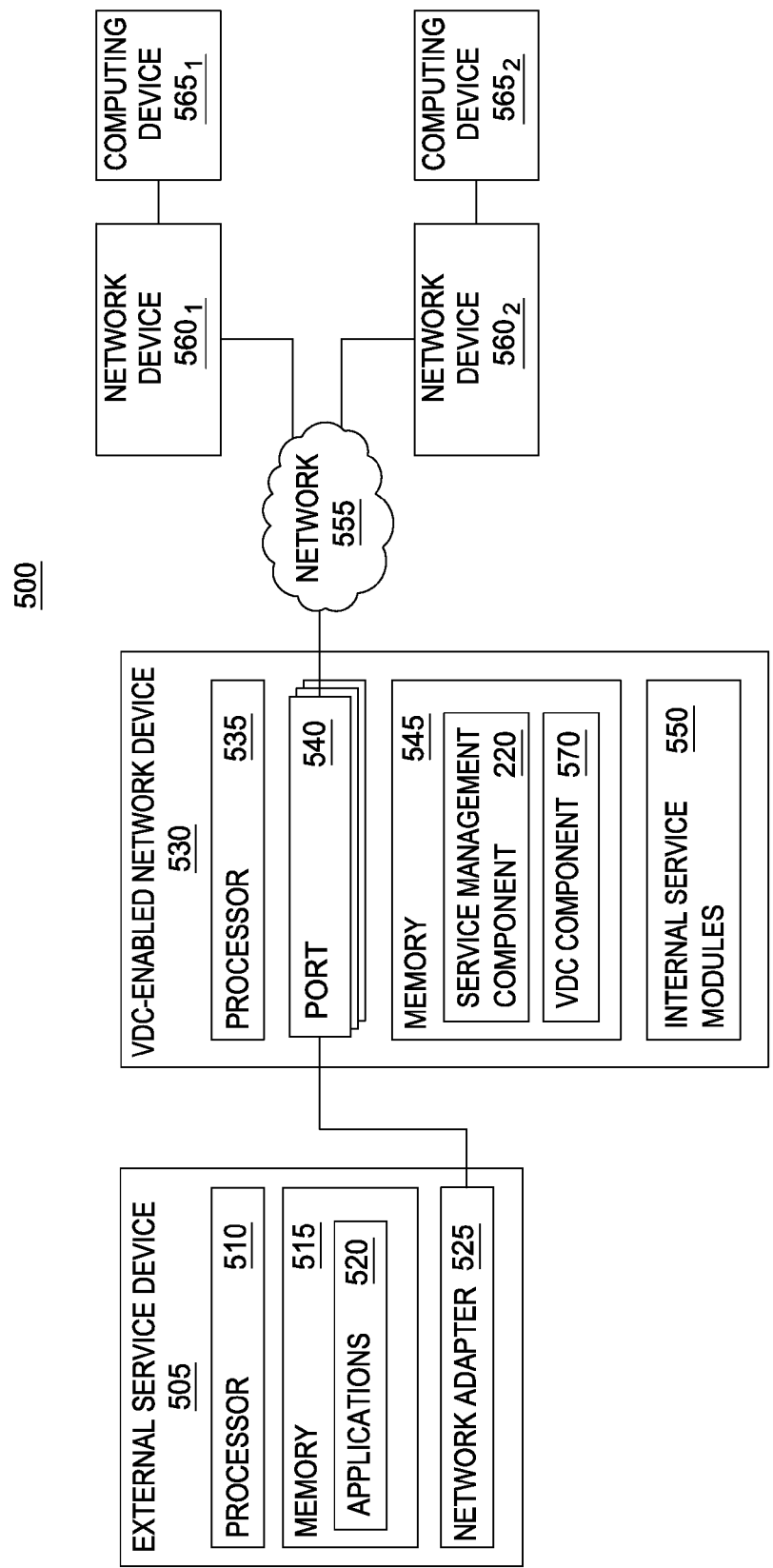
FIG. 5 illustrates a network containing a VDC-enabled network device, according to one embodiment described herein.

FIG. 5 illustrates a network containing a VDC-enabled network device, according to one embodiment described herein. Communication network 500 includes an external service module 505, coupled to a VDC-enabled network device 530. The external service module 505 includes a processor 510, memory 515, and network adapter 525. The processor 510 may be any processing element capable of performing the functions described herein. The processor 510 represents single processor, multiple processors, a processor with multiple cores, and combinations thereof. The memory 515 may be either volatile or non-volatile memory and include, RAM, flash, cache, disk drives and the like. Although shown as a single entity, the memory 515 may be divided into different memory storage element such as RAM and one or more hard disk drives. Here, the memory 515 includes applications 520. Generally, the applications 520 represent any software and/or firmware that is configured to provide a service for a virtual network switch. Examples of such services include, without limitation, load balancing services and firewall services. The network adapter 525 facilitates communication between the VDC-enabled network device 530 and the external service module 505. The network adapter 525 may use either wired or wireless communication techniques to transmit data to, and receive data from, the VDC-enabled network device 530.

The VDC-enabled network device 530 includes a processor 535, communication ports 540, memory 545 and internal service modules 550. The processor 535 may be any processing element capable of performing the functions described herein. The processor 535 represents a single processor, multiple processors, a processor with multiple cores, and combinations thereof. The memory 545 may be either volatile or non-volatile memory and include, RAM, flash, cache, disk drives and the like. The memory 545 contains a service management component 220. As discussed above, the service management component 220 is generally configured to manage the allocation of service modules to virtual network switches (e.g., VDC instances) on the VDC-enabled network device 530. As discussed above, the internal service modules 550 may be, for example, logic expressed using hardware, firmware, software or some combination thereof that is configured to provide a particular service. As an example, an internal service module 550 could be an ASIC that resides on a pluggable card and that is communicatively connected to the network device 530 (e.g., when the card is plugged into a slot of the network device 530). Moreover, the memory 545 could also contain network logic—e.g., a content addressable memory—for forwarding data in the communication network 600. The device 530 may also include a control plane for configuring and managing the forwarding logic.

In the depicted example, the VDC-enabled network device 530 coupled to computing devices $565_{1-2}$ and other network devices $560_{1-2}$, using the ports 540. Generally, ports 540 connected to an external service module (e.g., external service device 505) or an internalized service module 550 are referred to herein as "service ports." For example, the network 555 represents one or more network devices that forward data plane traffic from one end device to another. The network may be a WAN (e.g., the Internet) or a LAN. In addition to forwarding data plane traffic, the network 555 may forward management plane or control plane traffic between the VDC-enabled network device 530 and the network devices $560_{1-2}$ or between the VDC-enabled network device 530 and the computing devices $565_{1-2}$.

As discussed above, the service management component 220 generally manages the mapping of service modules to virtual network switches (e.g., VDC instances) on the network device 530. The service management component 220 could identify a plurality of service modules (e.g., external service module 505 and internal service module 550), each configured to perform a respective service. The service management component 220 could retrieve service policy information for a plurality of virtual switches running on the network device 530. Such service policy information is generally indicative of service requirements for each of the plurality of virtual switches. For instance, the service policy information could specify a virtual switch's minimum required amount of throughput for a particular service, as well as the virtual switch's maximum usable throughput for the particular service. Upon detecting that a service module is available for assignment, the service management component 220 could determine one of the plurality of virtual switches to map the available service module to, based on the service policy information, and could map the available service module to the determined virtual switch.

Additionally, it is specifically contemplated that embodiments may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Cloud computing resources may be provided to a user on a pay-per-use basis, where users are charged only for the computing resources actually used (e.g., an amount of storage space consumed by a user or a number of virtualized systems instantiated by the user). A user can access any of the resources that reside in the cloud at any time, and from anywhere across the Internet. In context of the present disclosure, a service management component 220 could execute on a physical network switch hosting multiple virtual network switches in a data center for the cloud. Upon determining that a service module connected to the physical switch has become available, the service management component 220 could determine one of the virtual network switches to map the available service module to, and could map the available service module accordingly. Advantageously, doing so helps to ensure efficient utilization of service module resources in the data centers for the cloud.

While the previous discussion is directed to embodiments of the present disclosure, other and further embodiments of the disclosure may be devised without departing from the basic scope thereof. For example, aspects of the present disclosure may be implemented in hardware or software or in a combination of hardware and software. One embodiment of the disclosure may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present disclosure, are embodiments of the present disclosure.

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method for mapping service modules on a network device, comprising:
    mapping a first one of a plurality of service modules to a first one of a plurality of virtual switches on the network device, wherein each of the plurality of service modules comprises respective external processing resources separate from the network device and configured to perform a respective service, and wherein the first service module is mapped to the first virtual switch such that the first service module performs the respective service for the first virtual switch by processing at least a portion of network data passing through the first virtual switch on the external processing resources of the first service module;
    retrieving service policy information for the plurality of virtual switches, the service policy information indicative of service requirements for each of the plurality of virtual switches;
    upon detecting an occurrence of a predefined event, determining a second one of the plurality of virtual switches to map the first service module to, based on a determination that the first service module is capable of satisfying at least one requirement of the second virtual switch, as specified in the service policy information; and
    mapping the first service module to the second virtual switch, such that the first service module processes at least a portion of network data passing through the second virtual switch on the external processing resources of the first service module.

2. The method of claim 1, wherein each of the plurality of service modules is assigned to a respective one or more service ports of the network device.

3. The method of claim 2, wherein mapping the first service module to the second virtual switch further comprises mapping the one or more service ports assigned to the first service module to the second virtual switch.

4. The method of claim 1, further comprising:
    monitoring the plurality of virtual switches to detect when one of the virtual switches becomes unavailable, and
    wherein detecting that the first service module is no longer being used by the first virtual switch further comprises determining that the first virtual switch has become unavailable.

5. The method of claim 1, wherein the service policy information specifies a type of service needed for at least one of the plurality of virtual switches.

6. The method of claim 5, wherein the service policy information further specifies a minimum service throughput value, indicative of a minimum amount of throughput for the specified type of service needed by the at least one of the virtual switches.

7. The method of claim 6, wherein the service policy information further specifies a maximum service throughput utilization value, indicative of a maximum amount of throughput for the specified type of service that can be effectively utilized by the at least one of the virtual switches.

8. A network device, comprising:
    a processor;
    an interface for communicating with a plurality of external service modules; and
    a memory containing a program that, when executed by the processor, performs an operation for mapping service modules, comprising:
        mapping a first one of the plurality of service modules to a first one of a plurality of virtual switches on the network device, wherein each of the plurality of service modules comprises external processing resources separate from the network device and is configured to perform a respective service, and wherein the first service module is mapped to the first virtual switch such that the first service module performs the respective service for the first virtual switch by processing at least a portion of the network data passing through first virtual switch on the external processing resources of the first service module;
        retrieving service policy information for the plurality of virtual switches, the service policy information indicative of service requirements for each of the plurality of virtual switches;

upon detecting an occurrence of a predefined event, determining a second one of the plurality of virtual switches to map the first service module to, based on a determination that the first service module is capable of satisfying at least one requirement of the second virtual switch, as specified in the service policy information; and mapping the first service module to the second virtual switch such that the first service module processes at least a portion of network data passing through the second virtual switch on the external processing resources of the first service module.

9. The network device of claim 8, wherein each of the plurality of service modules is assigned to a respective one or more service ports of the network device.

10. The network device of claim 9, wherein mapping the first service module to the second virtual switch further comprises mapping the one or more service ports assigned to the first service module to the second virtual switch.

11. The network device of claim 8, the operation further comprising:
monitoring the plurality of virtual switches to detect when one of the virtual switches becomes unavailable, and
wherein detecting that the first service module is no longer being used by the first virtual switch further comprises determining that the first virtual switch has become unavailable.

12. The network device of claim 8, wherein the service policy information specifies a type of service needed for at least one of the plurality of virtual switches.

13. The network device of claim 12, wherein the service policy information further specifies a minimum service throughput value, indicative of a minimum amount of throughput for the specified type of service needed by the at least one of the virtual switches.

14. The network device of claim 13, wherein the service policy information further specifies a maximum service throughput utilization value, indicative of a maximum amount of throughput for the specified type of service that can be effectively utilized by the at least one of the virtual switches.

15. A computer program product for mapping service modules on a network device, comprising:
a non-transitory computer-readable medium that stores computer codes for execution by a processor, wherein the computer codes comprise:
computer code that maps a first one of a plurality of service modules to a first one of a plurality of virtual switches on the network device, wherein each of the plurality of service modules comprises respective external processing resources separate from the network device and is configured to perform a respective service, such that the first service module performs the respective service for the first virtual switch by processing at least a portion of the network data passing through the first virtual switch on the external processing resources of the first service module;
computer code that retrieves service policy information for the plurality of virtual switches, the service policy information indicative of service requirements for each of the plurality of virtual switches;
computer code that, upon detecting an occurrence of a predefined event, determines a second one of the plurality of virtual switches to map the first service module to, based on a determination that the first service module is capable of satisfying at least one requirement of the second virtual switch, as specified in the service policy information; and
computer code that maps the first service module to the second virtual switch such that the first service module processes at least a portion of the network data passing through the second virtual switch on the external processing resources of the first service module.

16. The computer program product of claim 15, wherein each of the plurality of service modules is assigned to a respective one or more service ports of the network device.

17. The computer program product of claim 16, wherein the computer code that maps the first service module to the second virtual switch further comprises computer code that maps the one or more service ports assigned to the first service module to the second virtual switch.

18. The computer program product of claim 15, further comprising:
computer code that monitors a plurality of virtual switches to detect when one of the virtual switches becomes unavailable, and
wherein the computer code that detects that the first service module is no longer being used by the first virtual switch further comprises computer code that determines that the first virtual switch has become unavailable.

19. The computer program product of claim 15, wherein the service policy information specifies a type of service needed for at least one of the plurality of virtual switches.

20. The computer program product of claim 19, wherein the service policy information further specifies a minimum service throughput value, indicative of a minimum amount of throughput for the specified type of service needed by the at least one of the virtual switches, and
wherein the service policy information further specifies a maximum service throughput utilization value, indicative of a maximum amount of throughput for the specified type of service that can be effectively utilized by the at least one of the virtual switches.

21. The method of claim 1, wherein the external processing resources include at least one of a service executing on an external computing system and an application-specific integrated circuit communicatively connected to the network device.

* * * * *